United States Patent [19]

Watjer et al.

[11] Patent Number: 4,640,542
[45] Date of Patent: Feb. 3, 1987

[54] MOBILE TELEPHONE MOUNT FOR A VEHICLE

[75] Inventors: Sheldon J. Watjer, Holland; Edward T. Boerema, Zeeland, both of Mich.

[73] Assignee: Prince Corporation, Holland, Mich.

[21] Appl. No.: 762,879

[22] Filed: Aug. 6, 1985

[51] Int. Cl.⁴ ............................................. B60R 7/04
[52] U.S. Cl. ................................. 296/37.8; 312/319
[58] Field of Search .............. 296/37.12, 37.8, 37.14; 297/191, 192, 194; 312/319, 246; 224/42, 42 R

[56] References Cited

U.S. PATENT DOCUMENTS

| | | | |
|---|---|---|---|
| 2,797,739 | 7/1957 | Orsini | 297/194 |
| 2,882,349 | 4/1959 | Morawitz | 179/147 |
| 3,103,630 | 9/1963 | Pitts | 297/113 |
| 3,606,112 | 9/1971 | Cheshier | 312/246 |
| 3,632,158 | 1/1972 | Boothe | 296/37.1 |
| 3,951,448 | 4/1976 | Hawie | 297/191 |
| 4,052,103 | 10/1977 | Steinthal | 297/113 |
| 4,087,126 | 5/1978 | Wynn | 296/37.8 |
| 4,493,417 | 1/1985 | Ackeret | 312/319 |

FOREIGN PATENT DOCUMENTS

| | | | |
|---|---|---|---|
| 2017937 | 10/1971 | Fed. Rep. of Germany | 296/37.8 |
| 2536854 | 3/1977 | Fed. Rep. of Germany | 296/37.8 |

Primary Examiner—Robert R. Song
Attorney, Agent, or Firm—Price, Heneveld, Cooper, DeWitt & Litton

[57] ABSTRACT

A telephone mount for an automobile includes a telephone housing in which a telephone receiver carriage is slidably mounted. The carriage slides along arcuate guide tracks in order to both translate and rotate while shifting between the storage position within the housing and a use position in which the receiver is located through the housing opening. A constant force spring biases the carriage from the storage position to the use position and a latch mechanism maintains the carriage in the storage position.

26 Claims, 17 Drawing Figures

MOBILE TELEPHONE MOUNT FOR A VEHICLE

BACKGROUND OF THE INVENTION

The present invention relates to mounts for mobile telephones used in automobiles or other vehicles.

A variety of mobile telephones have been used previously in automobiles. Such mobile telephones are substantially similar in terms of the handset to fixed base telephones. The systems naturally include a radio transmitter-receiver system typically mounted in the trunk of the vehicle. The mobile telephone system includes a hand-held telephone receiver and dialing assembly or handset, and also includes a support cradle with an on-off switch and accompanying circuitry. The radio telephone receiver and cradle, are normally mounted on or under the automobile dashboard to be accessible to the driver of the automobile.

Heretofore, most automobile telephones have been openly mounted within the vehicle to be readily accessible to the driver without undue distraction from driving duties which necessitates this open mounting. The telephone receiver is therefore exposed and generally in the way of the vehicle's occupants, as well as detracting from the aesthetic appearance of the vehicle interior. In vehicles that have previously provided a compartment for the telephone receiver, the compartment has been relatively large and therefore space consuming to allow easy operator access to the telephone receiver.

SUMMARY OF THE INVENTION

The present invention is embodied in a telephone mount for an automobile that includes a housing with a telephone receiver carriage movably mounted therein. The carriage moves between a storage position in which the telephone receiver is positioned within the housing and a use position in which at least a portion of the telephone receiver extends from the housing for access. In a preferred embodiment, a constant force spring biases the carriage from the storage position to the use position, to urge the telephone receiver to a position in which an operator can readily grasp the receiver. Preferably, the mount includes arcuate guide tracks for guiding the carriage in its motion between the storage and use positions, and a latch mechanism that releasably secures the carriage in the storage position.

With the device of the present invention, an operator can readily hang the telephone receiver on the carriage and then shift both the carriage and mounted receiver into the housing for storage. While in the stored position, the housing protects the telephone receiver and the telephone unit is stored out of the way. The housing access opening may be covered, such that the receiver is conveniently stored out of sight of occupants of the vehicle. However, the telephone mount permits ready access to the receiver by providing the carriage with the ability to automatically shift the receiver out of the housing. The present telephone mount thus provides for the compact, convenient and safe storage of the telephone, such that a driver can readily both store and extricate the telephone receiver from the housing without being distracted from his driving duties.

These and other features, advantages and objectives of the invention will be recognized by one skilled in the art from the specification, claims and drawings appended hereto.

DETAILED DESCRIPTION OF THE PREFERRED EMBODIMENTS

Figure 1:
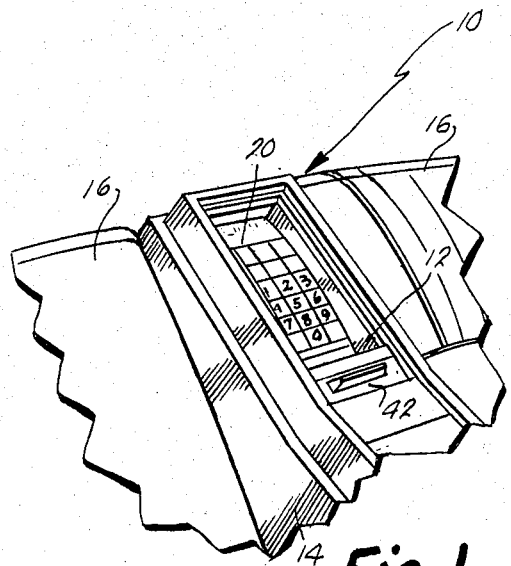
FIG. 1 is a fragmentary, perspective view of a telephone mount in an automobile embodying the present invention, shown with the telephone mount in a storage position.
Figure 2:
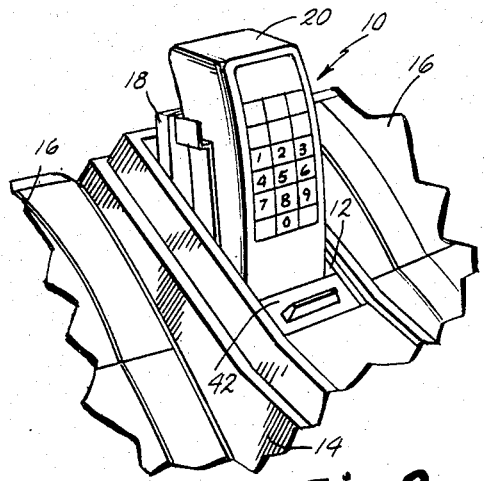
FIG. 2 is a fragmentary, perspective view of the telephone mount of FIG. 1, shown with the telephone mount in a use position.
Figure 3:
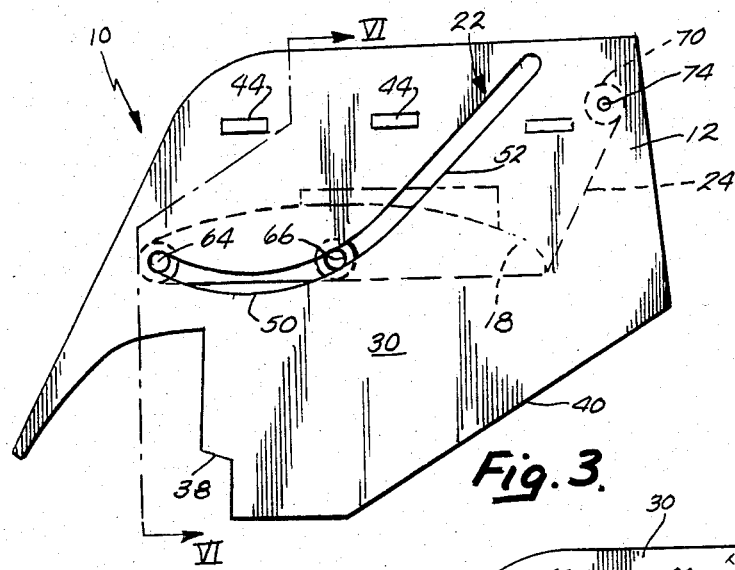
FIG. 3 is a right side elevational view of a telephone mount embodying the present invention, shown with the telephone receiver carriage in a storage position.
Figure 4:
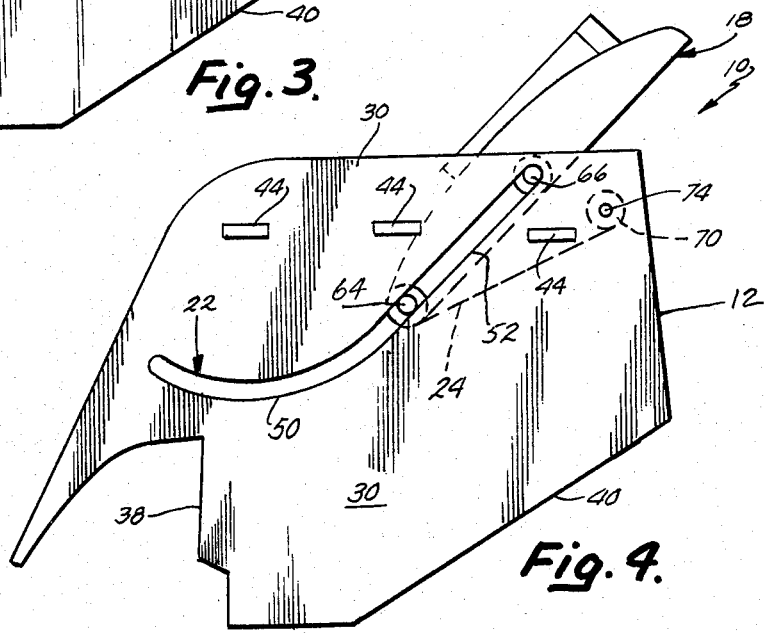
FIG. 4 is a right side elevational view of the telephone mount of FIG. 3, shown with the telephone receiver carriage in a use position.
Figure 5:
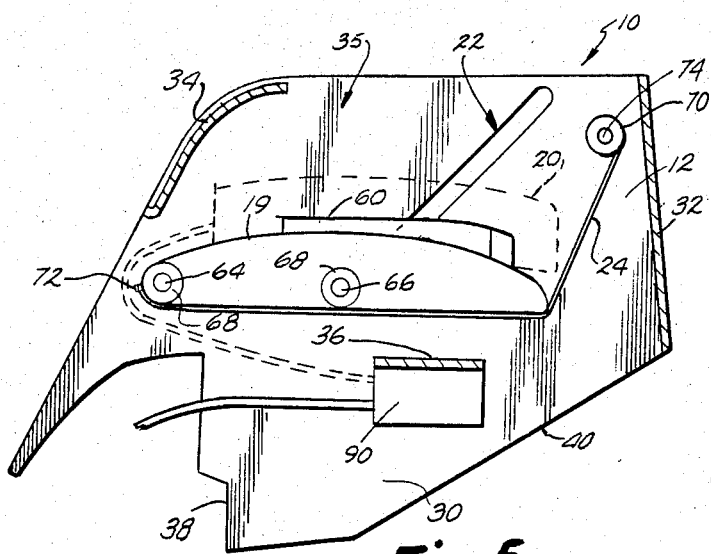
FIG. 5 is a cross-sectional view taken along plane V—V of FIG. 6, shown with the telephone receiver carriage in a storage position.
Figure 8:
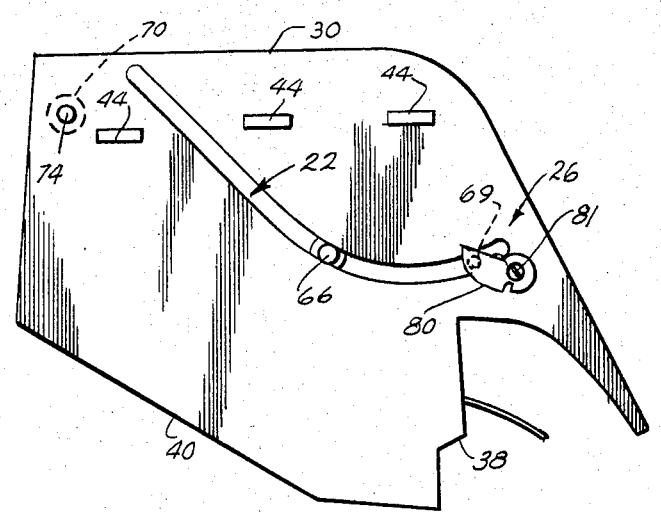
FIG. 8 is a left side elevational view of the telephone mount shown in FIG. 3.

The present invention is embodied in a mount 10 for a telephone 20 for use in a vehicle such as an automobile 11. In a preferred embodiment shown in FIGS. 1 and 2, telephone mount 10 includes a telephone unit housing 12 mounted within an automobile console 14 located between the front seats 16 of the vehicle. A carriage 18 (FIG. 2) is slidably mounted within housing 12 to provide a support for a receiver 20 of the mobile telephone unit. Carriage 18 shifts receiver 20 from a storage position shown in FIG. 1 in which receiver 20 is stored within housing 12, to a position of use shown in FIG. 2 in which at least a portion of receiver 20 protrudes upwardly from housing 12 in order to be readily accessible. As shown in FIGS. 3-5, carriage 18 slides on arcuate guide tracks 22 formed in sidewalls 30 of housing 12, and is biased from the stored position to the use position by a constant force spring 24. As shown in FIG. 8, a latch mechanism 26 selectively maintains carriage 18 in the stored position. When latch mechanism 26 is released, constant force spring 24 slides carriage 18 along guide tracks 22 in order to automatically shift carriage 18 from the stored position to the use position.

Figure 6:
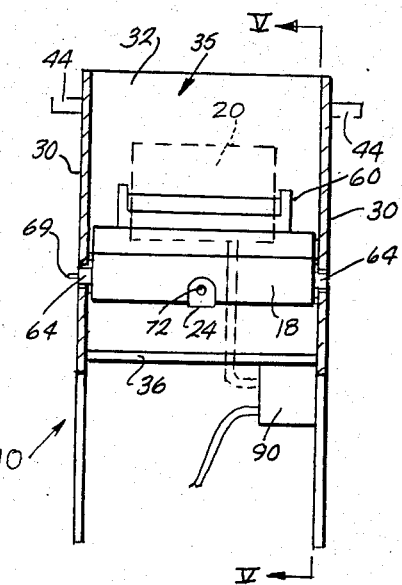
FIG. 6 is a cross-sectional view taken along plane VI—VI of FIG. 3.

Housing 12 forms a metal box having parallel sidewalls 30 (FIGS. 3-6) joined by a front wall 32 and a back wall 34 (FIG. 5). Sidewalls 30, front wall 32 and back wall 34 define an access opening 35 that opens generally upwardly through housing 12. A reinforcing crossbrace 36 joins a lower portion of sidewalls 30 beneath the mounting zone for carriage 18. Sidewalls 30 are configured in order to be mounted within console 14 of the particular vehicle desired, an exemplary configuration being shown in FIGS. 3-5 and having a lower rear notch 38 and an angled lower forward surface 40 that accommodate the transmission tunnel on the floor of the vehicle. As shown in FIG. 5, rear wall 34 is recessed slightly from the upper edge of sidewalls 30 in order to form a channel that accommodates a sliding closure door 42 (FIGS. 1-2) of the console, that is used to conceal receiver 20 when in the stored condition. Protruding outwardly from both sidewalls 30 are a plurality of spaced raised lands or brackets 44 (FIGS. 3, 6) which are used to secure housing 12 in console 14 by conventional fasteners.

As best seen in FIGS. 3 and 4, guide tracks 22 are formed by an arcuate slot through each sidewall 30. Each guide track 22 includes a lower curved zone 50 that curves concavely upward, and a forward linear zone 52 that angles upwardly to incline forwardly from curved zone 50 at approximately 45 degrees. When carriage 18 is seated in curved zone 50 (FIG. 3), carriage 18 is generally horizontal so that receiver 20 is in the storage position shown in FIG. 1. When carriage 18 is slid forward into linear zone 52 (FIG. 4), carriage 18 is inclined and protrudes through access opening 35 such that receiver 20 is in an accessible use position shown in FIG. 2.

Figure 7:
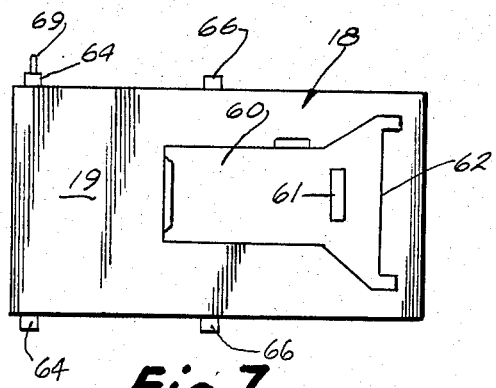
FIG. 7 is a top plan view of the telephone receiver carriage of the embodiment shown in FIGS. 1-6.

As shown in FIGS. 5 and 7, carriage 18 has a generally rectangular body with a curved upper surface 19. A conventional telephone receiver cradle 60 is mounted on the curved upper surface of carriage 18. Cradle 60 includes a conventional forked forward end 62 (FIG. 7) that receives the earpiece of receiver 20. Cradle 60 also includes a conventional switch 61 that disconnects the telephone when the receiver is seated on cradle 60. Extending from opposite sides at the rear edge of carriage 18 are a pair of rear followers 64. A pair of forward followers 66 extend from opposite sides of carriage 18 and are spaced forward of rear followers 64 at approximately the median line of carriage 18. As shown in FIGS. 3 and 4, followers 64 and 66 are received in guide tracks 22. Followers 64 and 66 are cylindrical posts made of a polymeric material to form a self lubricating bearing surface that slides along guide tracks 22. As shown in FIG. 5, followers 64 and 66 integrally include a circular shoulder 68. Shoulders 68 provide bearing surfaces that contact the inner surface of sidewalls 30 in order to prevent binding between carriage 18 and sidewalls 30.

As shown in FIG. 3, when in the stored position followers 64 and 66 are generally horizontally aligned and seated in the curved zone 50 of tracks 22 with the forward end of carriage 18 extending forward of curved zone 50. When carriage 18 is shifted to the use position (FIG. 4), followers 64 and 66 are seated in linear zone 52 with the forward end of carriage 18 protruding up through access opening 35. Protruding from one rear follower 64 is a latch post 69 (FIG. 7) which is used in latch mechanism 26 in order to releasably secure carriage 18 in the storage position as described below.

As shown in FIG. 5, constant force spring 24 is formed from a flat spring steel band that extends from the rear of carriage 18 to a spring take-up drum 70 located adjacent front wall 32. Although spring 24 is formed from a flat band of metal, spring 24 curves slightly across its width when drawn from drum 70 due to the spring forces generated by the band. The dimensions and spring force of spring 24 will vary depending upon the weight of carriage 18 and receiver 20 and the curvature of tracks 22. One preferred spring 24 is a band of stainless steel material approximately 0.750 inch wide and 0.008 inch thick. Spring 24 is secured by a pin 72 or other appropriate fastener to the rear of carriage 18, and is also secured by conventional fastening means to takeup drum 70. Take-up drum 70 is preferably 0.870 inches in diameter and rotates on an axle 74 that spans between sidewalls 30. Spring 24 biases itself into a coil about drum 70, thereby biasing the rear end of carriage 18 toward drum 70. This biasing of constant force spring 24 causes carriage 18 to slide along guide tracks 22 and thereby shift from the storage position (FIG. 1) to the use position (FIG. 2) in which receiver 20 is located through the upper access opening 35. Carriage 18 therefore both translates and rotates relative to housing 12 as it shifts between the storage and use positions.

Figure 9A:
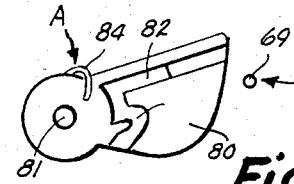
FIGS. 9A through 9E are a progression of schematic drawings showing the operation of the carriage latch mechanism of FIG. 8.
Figure 9B:
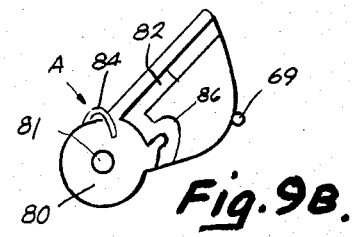
Figure 9C:
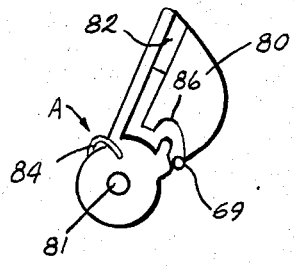
Figure 9D:
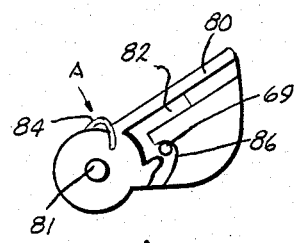
Figure 9E:
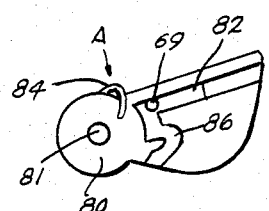

Latch mechanism 26 (FIG. 8) is a double push-type latch that selectively maintains carriage 18 in the storage position. Latch mechanism 26 includes a cam 80 that is pivotally secured to sidewall 30 by a screw 81. Cam 80 engages and latches post 69 in the storage position. As shown in FIGS. 9A through 9E, cam 80 includes a configured groove or recess 82 along its inner surface. Cam 80 includes a coil spring 84 that biases cam 80 in a clockwise direction as indicated in FIG. 9 by Arrow A. In order to latch carriage 18 in place, the forward end of receiver 20 is pressed down into housing 12, causing post 69 to slide toward cam 80 (FIG. 9A). As post 69 engages cam 80, cam 80 is rotated counterclockwise against spring 84 and post 69 continues to slide along the forward edge of cam 80 (FIG. 9B). When post 69 reaches the inlet to groove 82 (FIG. 9C), spring 84 snaps cam 80 down over post 69 and upon release post 69 is seated in a latching seat 86 of groove 82 (FIG. 9D). Post 69 is thus prevented from sliding forward and thus carriage 18 is secured in the storage position. In order to release carriage 18, the forward end of receiver 20 is simply pressed down, which causes post 69 to slide rearward until it is freed from latch seat 86 which enables spring 84 to snap cam 80 downward (FIG. 9G), thus permitting post 69 to slide forward out of groove 82. Constant force spring 24 draws carriage 18 forward when post 69 is so released. Axial clearance is provided between cam 80 and mounting post 81, and the outlet to groove 82 is ramped so that latch post 69 will contact the forward edge of cam 80 rather than sliding backward into groove 82.

Conventional telephone circuitry and/or a radio transmitter-receiver circuit 90 (FIGS. 5, 6) may be mounted in housing 12 beneath cross brace 36, or alternatively may be located remote from housing 12.

Figure 10:
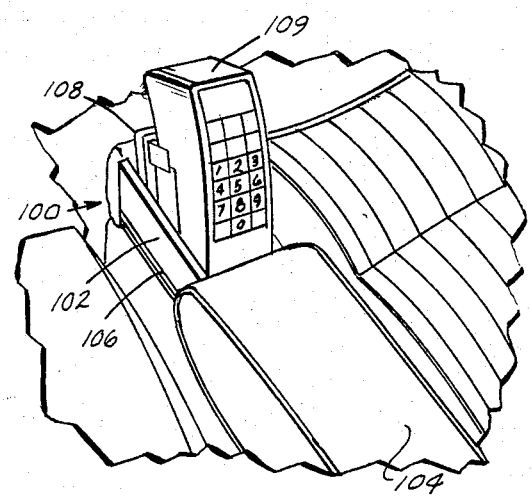
FIG. 10 is a fragmentary, perspective view of an alternative embodiment of the invention shown in an automobile.

A second preferred embodiment is shown in FIG. 10, and includes a telephone mount referenced generally by the numeral 100. Telephone mount 100 includes a housing 102 that is slidably mounted in an armrest 104. Plastic panels are secured to the sides of housing 102 and include guide tracks 106 that slidably engage followers (not shown) on the inside of armrest 104. Housing 102 may alternatively be provided with a series of telescoping side panels that permit housing 102 to slide into armrest 104. A carriage 108 is slidably mounted within housing 102, in order to provide a sliding mount for receiver 109. Housing 100 and carriage 108 operate in the same manner as the first embodiment described above, with the exception of the armrest mounting of housing 100.

Figure 13:
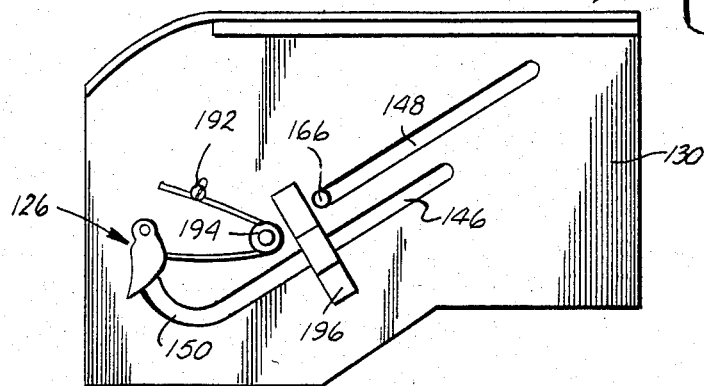
FIG. 13 is a right side elevational view of the telephone mount of FIG. 11.
Figure 11:
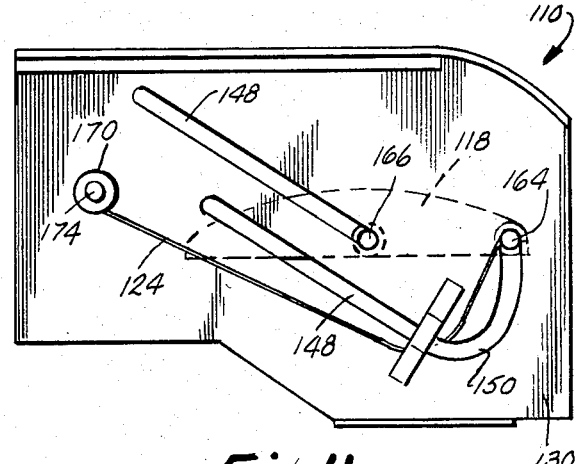
FIG. 11 is a left side elevational view of a telephone mount forming still another embodiment of the invention, shown with the telephone receiver carriage in a storage position.
Figure 12:
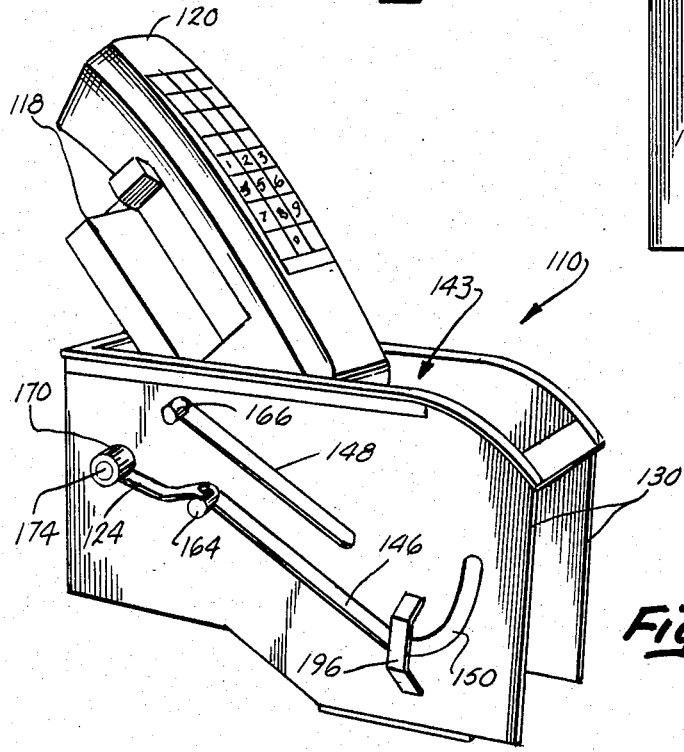
FIG. 12 is a perspective view of the telephone mount of FIG. 11, shown with the telephone receiver carriage in a use position.

A third preferred embodiment of a telephone mount 110 is shown in FIGS. 11 through 13, which operates similarly to the first embodiment described above with the exception of the features discussed below. Telephone mount 110 includes a housing 112 and carriage 118 for a receiver 120. Housing 112 includes a pair of sidewalls 130 with an upper access opening 143 (FIG. 12). Telephone mount 110 differs from the first described embodiment in part in that each guide track includes a lower curved guide slot 146 and an upper linear guide slot 148 in each sidewall 130. Carriage 118 includes a pair of rear followers 164 and a pair of forward followers 166 similar to followers 64 and 66 described above. Rear followers 164 are slidably received in lower slot 146, while forward followers 166 are received in upper slots 148. Each lower slot 146 includes a right angle curved zone 150 at its lower end. As rear followers 164 slide forward along the curve of lower slot 146, carriage 118 pivots about forward followers 166, thus raising the forward end of carriage 118 in order to position receiver 120 through access opening 143.

As shown in FIGS. 11 and 12, a constant force spring 124 is mounted on the outer surface of one sidewall 130. One rear follower 164 protrudes through guide slot 146 in order to form an anchor post for constant force spring 124. Constant force spring 124 is a spring steel band that is secured to a take-up drum 170 rotatably mounted on an axle 174. Constant force spring 124 operates in the same manner as constant force spring 24 described above, in order to bias carriage 108 forward into the use position shown in FIG. 12.

A latch mechanism 126 (FIG. 13) is mounted on sidewall 130 opposite the sidewall on which constant force spring 124 is mounted. Latch mechanism 126 is similar in structure and operation to latch mechanism 26 described above. Protruding from the rear follower 164 is a latch post (not shown) that protrudes through lower slot 146 in order to engage latch mechanism 126. Additionally a U-shaped bent wire spring 190 engages the latch post in order to force it downward through the right angle curve of lower slot 146. Spring 190 thus assists in the shifting of carriage 118 forward along the guide tracks formed by slots 146 and 148. Spring 190 includes a mounting screw 192 and a clamping post 194 that secure spring 192 to sidewall 130. A reinforcing bracket 196 spans lower guide slot 146 on either sidewall 130 in order to reinforce housing 102.

It will be recognized by one skilled in the art that various modifications or improvements may be made in the above devices without departing from the spirit of the invention disclosed herein. The scope of protection afforded is to be determined by the claims which follow and the breadth of interpretation that the law allows.

The embodiment of the invention in which an exclusive property or privilege is claimed are as follows:

1. A telephone mount for use in an automobile, comprising:
   a telephone unit storage housing having an access opening thereto;
   a telephone carriage including a telephone receiver mounted thereon, said carriage being movable between a storage position in which said carriage locates said telephone receiver carried thereon within said storage housing and a use position in which said carriage locates at least a portion of said telephone receiver carried thereon through said access opening; and
   means for mounting said carriage in said housing for movement in an arcuate path from said storage position to said use position, whereby said carriage moves the telephone receive between said storage position within said housing and a position at least partially extended from said housing to said use position in which an operator can operate the telephone receiver.

2. The telephone mount of claim 1, wherein:
   said carriage moving means comprises a means for biasing said carriage from said storage position to said use position, and means for selectively maintaining said carriage in said storage position.

3. The telephone mount of claim 2, wherein:
   said biasing means includes a spring coupled between said housing and said carriage.

4. The telephone mount of claim 1, wherein:
   said moving means includes a constant force spring coupling between said housing and said carriage, said constant force spring biasing said carriage from said storage position to said use position.

5. The telephone mount of claim 4, wherein:
   said constant force spring comprises a spring band coiled around a mounting axle, said axle mounted in said housing with one end of said spring band anchored to said axle and an opposite end coupled to said carriage.

6. A telephone mount for an automobile, comprising:
   a telephone unit storage housing having an access opening thereto;
   a telephone carriage movably mounted in said housing, said carriage having a telephone receiver mount thereon, and said carriage being movable between a storage position in which said carriage locates a telephone receiver carried thereon within said storage housing and a use position in which said carriage locates at least a portion of a telephone receiver carried thereon through said access opening, wherein one of said housing and said carriage includes an arcuate guide track on each side thereof, and the other of said housing and said carriage includes track followers on each side thereof that are slidably received by said arcuate guide tracks, whereby said carriage is provided with the ability to translate and rotate relative to said housing; and
   means for moving said carriage from said storage position to said use position, whereby said carriage moves the telephone receiver between a position protected by said housing and a position at which an operator can grasp the telephone receiver.

7. The telephbne mount of claim 6, wherein:
   each said arcuate guide track comprises a single arcuate slot having two said track followers received therein.

8. The telephone mount of claim 6, wherein:
   each said arcuate guide track includes two slots, said two slots having different degrees of curvature relative each other, and one said track follower is received in each of said two slots.

9. The telephone mount of claim 4, further comprising:
   means for selectively latching said carriage in said storage position by depressing at least one end of said carriage and for unlatching said carriage from said storage position by depressing at least said one end of said carriage.

10. The telephone mount of claim 1, wherein:
said housing is mounted in an automobile console.

11. The telephone mount of claim 1, wherein said housing is mounted in an automobile armrest.

12. A telephone mount for an automobile, comprising:
a housing having an access opening thereon;
a carriage slidably mounted on a track in said housing, said carriage including a telephone receiver cradle thereon;
a constant force spring coupled between said housing and said carriage, said constant force spring biasing said carriage from a storage position in which said carriage disposes a receiver on said cradle within said housing to an access position in which said carriage disposes at least a portion of a receiver on said cradle through said access opening and wherein said track curves concavely upwardly such that said carriage both translates and rotates relative to said housing; and
said means for selectively maintaining said carriage in said storage position.

13. The telephone mount of claim 12, wherein:
said constant force spring comprises a band spring.

14. The telephone mount of claim 12, wherein:
said housing is mounted in an automobile console.

15. The telephone mount of claim 12, wherein:
said housing is mounted in an automobile armrest.

16. A telephone mount for an automobile, comprising:
a housing having an access opening thereon;
a telephone receiver carriage having a first end and a second end;
an arcuate track slidably mounting said carriage in said housing, said arcuate track being configured so that said carriage slides therealong between a storage position and a use position, said carriage having said first end and said second end in said housing when in said storage position and said carriage having at least said first end positioned outside of said housing when in said use position; and
means for shifting said carriage between said storage position and said use position.

17. The telephone mount of claim 16, wherein:
said arcuate track includes an upwardly concave zone and a substantially linear zone extending at an upward incline from said upwardly concave zone.

18. The telephone mount of claim 17, wherein:
said arcuate track includes a guide slot in either side of said housing, said carriage having slot followers thereon received in said slots.

19. The telephone mount of claim 17, wherein:
said arcuate track includes a pair of guide slots in either side of said housing, said carriage having slot followers thereon received in said slots.

20. The telephone mount of claim 17, further comprising:
a spring coupled between said housing and said carriage, said spring biasing said carriage from said storage position to said use position.

21. The telephone mount as defined in claim 6 and further including means for selectively latching said carriage in said storage position by depressing at least one end of said carriage and for unlatching said carriage from said storage position by depressing at least said one end of said carriage.

22. The telephone mount as defined in claim 6 wherein said housing is mounted in an automobile console.

23. The telephone mount as defined in claim 6 wherein said housing is mounted in an automobile armrest.

24. The telephone mount as defined in claim 6 wherein said carriage moving means includes means for biasing said carriage from said storage position to said use position, and means for selectively maintaining said carriage in said storage position.

25. The telephone mount as defined in claim 24 wherein said biasing means includes a constant force spring coupled between said housing and said carriage.

26. The telephone mount as defined in claim 25 wherein said constant force spring comprises a band spring.

* * * * *